US006366974B1

(12) United States Patent
Kung et al.

(10) Patent No.: US 6,366,974 B1
(45) Date of Patent: Apr. 2, 2002

(54) I/O CONNECTOR COMBINATION MODULE OF A PORTABLE COMPUTER

(75) Inventors: Shao-Tsu Kung; Ming-Shen Sun, both of Taipei (TW)

(73) Assignee: Compal Electronics, Inc., Taipei (TW)

( * ) Notice: Subject to any disclaimer, the term of this patent is extended or adjusted under 35 U.S.C. 154(b) by 0 days.

(21) Appl. No.: 09/311,296

(22) Filed: May 14, 1999

(51) Int. Cl.[7] .......................... G06F 13/00; H01R 25/00

(52) U.S. Cl. ....................................... 710/301; 439/638

(58) Field of Search ................................ 439/638, 639; 710/129, 101, 102, 103, 300, 301, 302

(56) References Cited

U.S. PATENT DOCUMENTS 5,411,416 A * 5/1995 Balon et al. ................ 439/639
5,676,567 A * 10/1997 Gluskoter et al. .......... 439/638
6,044,423 A * 3/2000 Seo et al. ................... 713/103

* cited by examiner

*Primary Examiner*—Glenn A. Auve
(74) *Attorney, Agent, or Firm*—Bacon & Thomas

(57) ABSTRACT

An I/O connector combination module of a portable computer, in which multiple I/O ports of the portable computer are combined on a circuit board. The circuit board is disposed with an I/O connector combination terminal and the main board of the portable computer is disposed with a combined I/O connecting terminal. The combination terminal and the I/O connecting terminal are electrically connected by a bus, so that the circuit board is modularized and applicable to different types of portable computers.

2 Claims, 8 Drawing Sheets

I/O CONNECTOR COMBINATION MODULE OF A PORTABLE COMPUTER

BACKGROUND OF THE INVENTION

The present invention relates to an I/O connector combination module of a portable computer, in which the I/O ports of the main board of the portable computer are moved onto a modularized circuit board so as to simplify the circuit of the main board. The modularized circuit board is applicable to different types of portable computers.

Please refer to FIG. 1. Generally, the I/0 ports 90 of a portable computer 100 are arranged on a back side 800 of the portable computer. Referring to FIG. 2, the I/O ports 90 are fixedly installed on the main board 80 of the portable computer and electrically connected with other components of the main board 80. FIG. 3 is a block diagram showing the connection between the components. The connectors of the peripheral equipment of the portable computer 100 (such as mouse, printer, dock, etc.) are inserted and connected with the I/O ports 90.

In the manufacturing of the portable computer, depending on the level of the product, the specification, dimension and even the use of the components of the portable computer are varied. The different components will lead to difference in arrangement of the components on the main board 80. Especially, the space of the main board 80 of the portable computer 100 for the arrangement is quite limited, while the I/O port 90 occupies a considerably large space. Therefore, it is necessary to modularize the I/O port 90 to reduce the using space of the main board 80.

Please refer to FIG. 4. When the connector of the peripheral equipment is inserted into the I/O port 90 of the main board 80, a shear force will be exerted onto the I/O port 90. After a period of suffering the shear force, the contact pins 900 of the I/O port 90 are subject to breakage and poor electric connection due to excessively great force. Therefore, in the conventional main board 80, a reinforcing board is disposed on a rear side of the I/O port 90 for offsetting the shear force caused by the insertion of the peripheral equipment. Such an arrangement is not ideal.

SUMMARY OF THE INVENTION

It is therefore a primary object of the present invention to provide a measure for modularizing and simplifying I/O ports of a portable computer in which multiple I/O ports of the portable computer are combined and separated from the main board.

It is a further object of the present invention to provide the above measure in which multiple I/O ports of the portable computer are combined and separated from the main board so that the shear force exerted onto the main board is transferred to another independent circuit board and the original reinforcing component can be omitted.

The present invention can be best understood through the following description and accompanying drawings wherein:

DETAILED DESCRIPTION OF THE PREFERRED EMBODIMENTS

Figure 1:
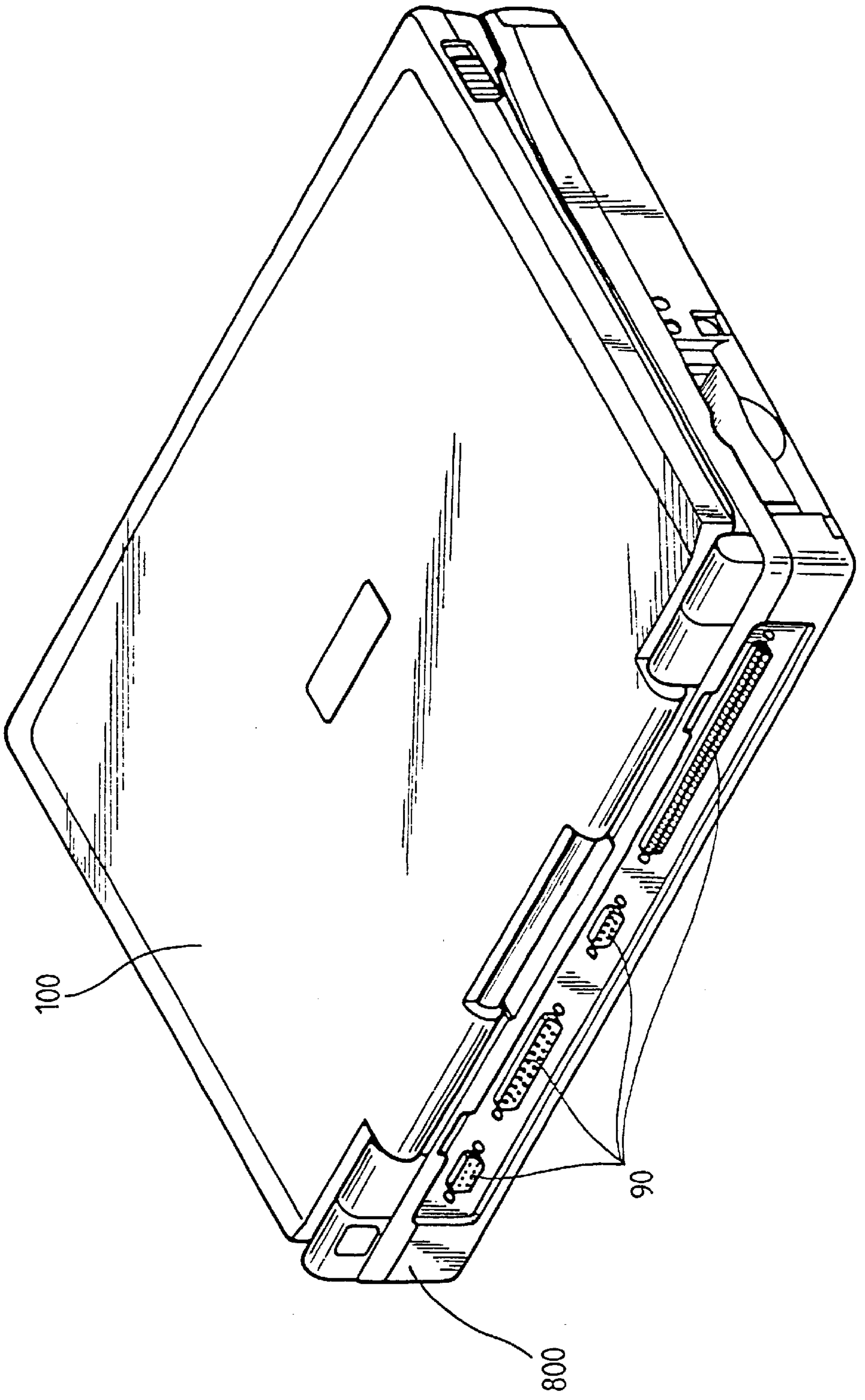
Fig. 1 (PRIOR ART)
FIG. 1 is a perspective view of a conventional portable computer.
Figure 2:
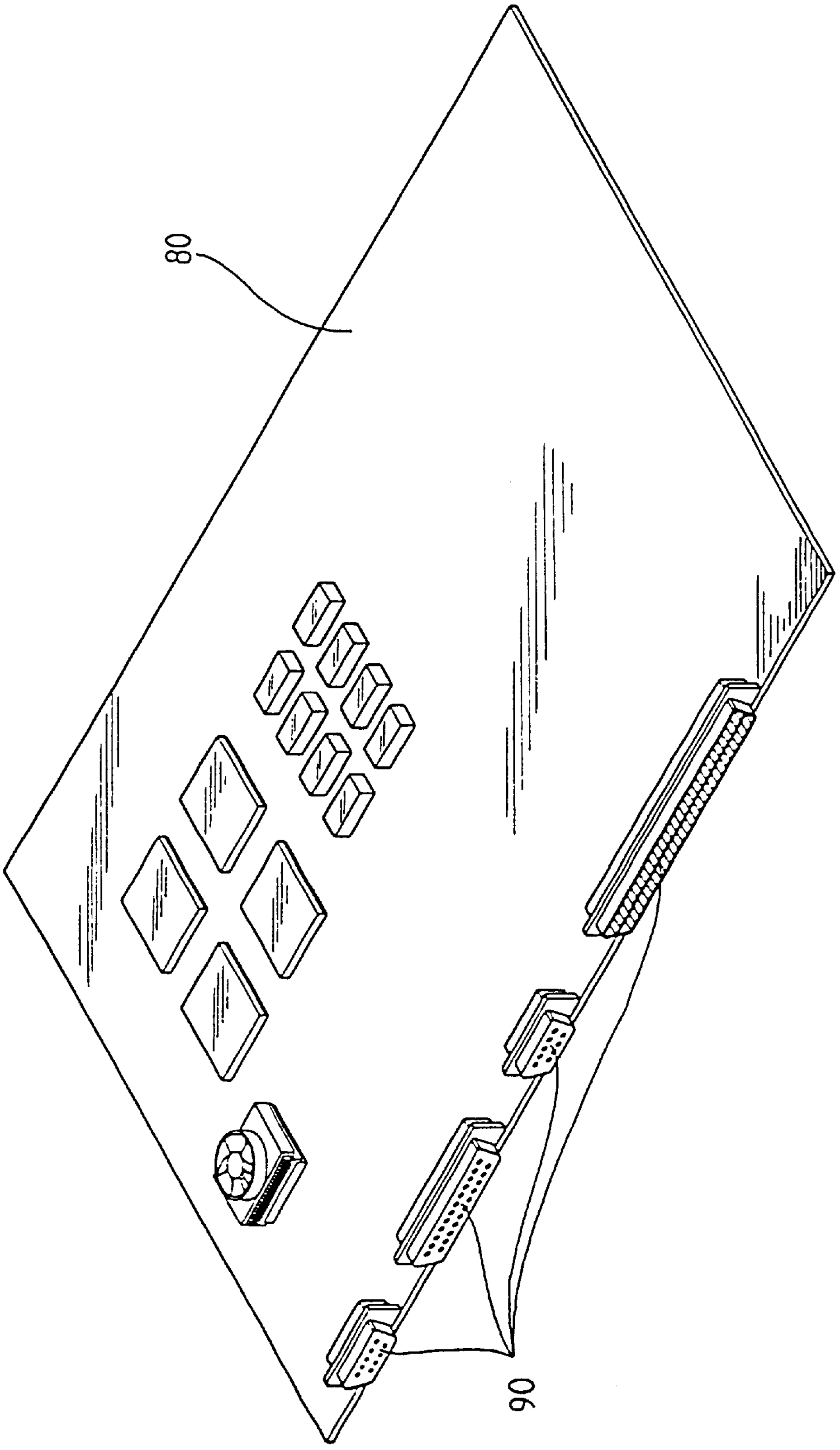
Fig. 2 (PRIOR ART)
FIG. 2 is a perspective view of a conventional main board of the portable computer.
Figure 3:
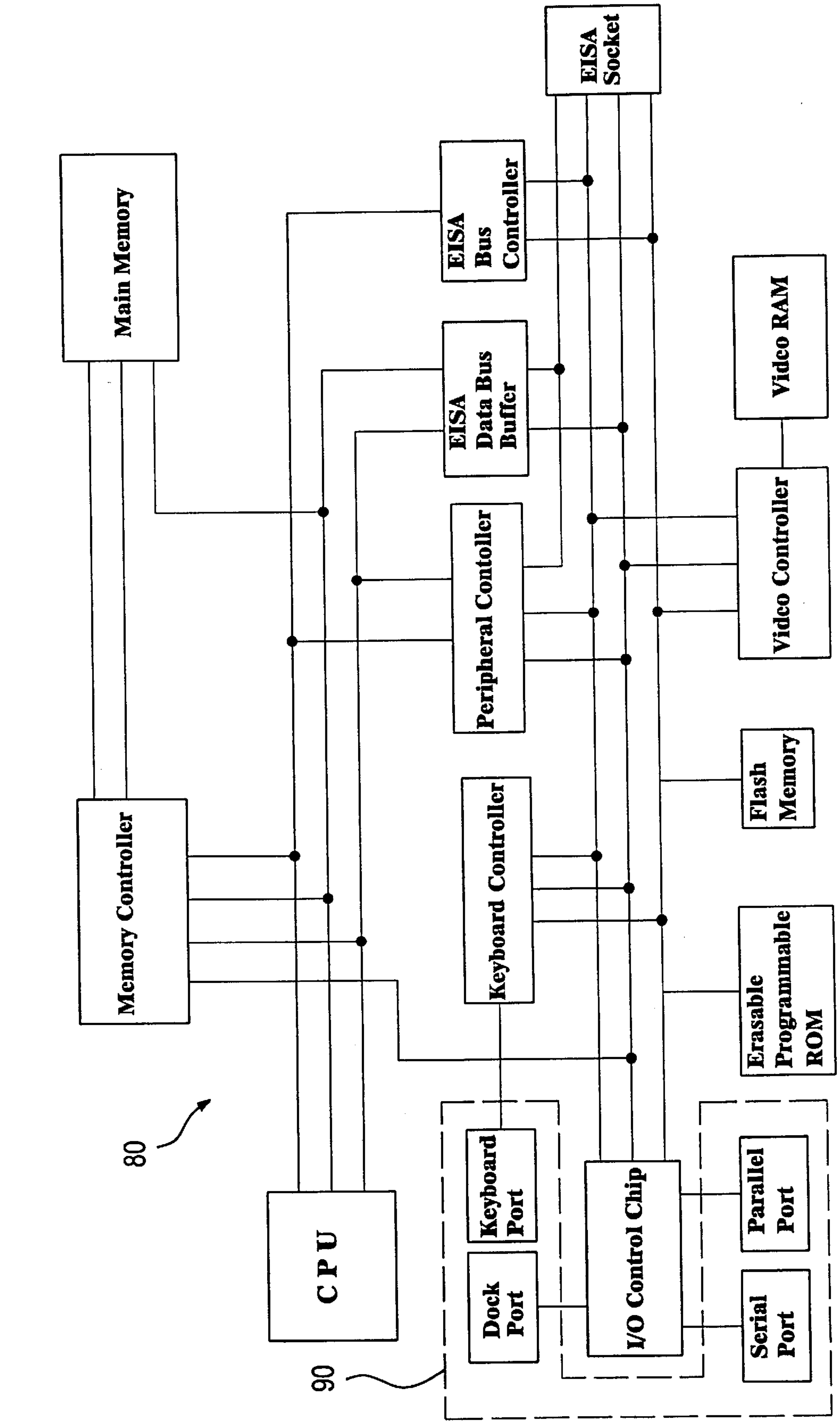
Fig. 3 (PRIOR ART)
FIG. 3 is a block circuit diagram of the conventional main board.
Figure 4:
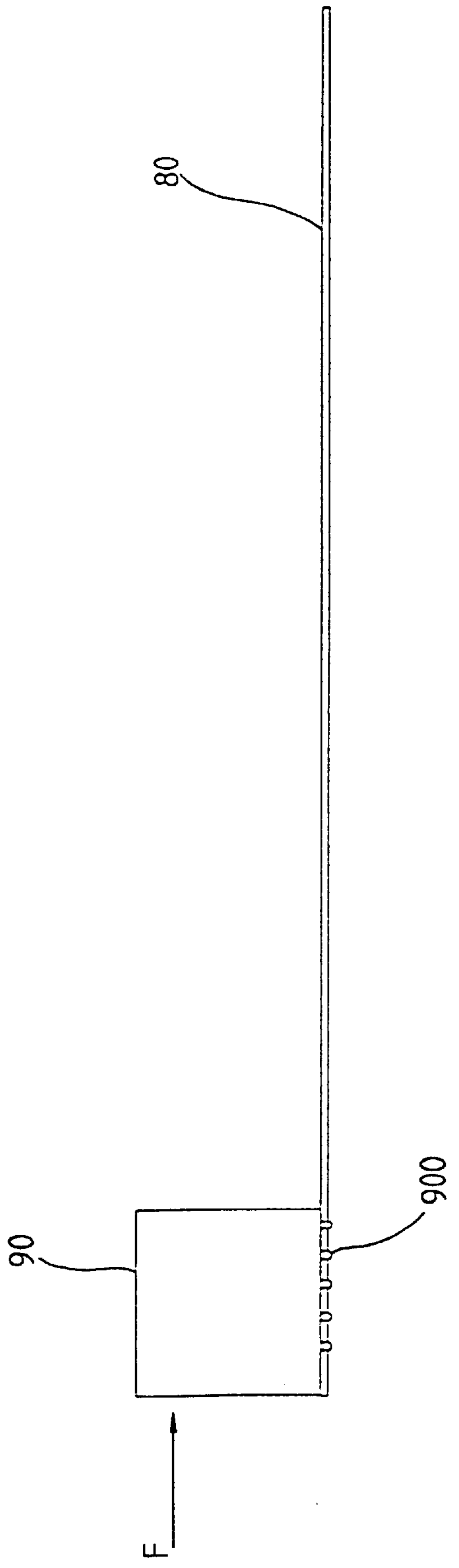
Fig.4 (PRIOR ART)
FIG. 4 shows the shear force exerted onto the conventional main board when a connector is inserted into the I/O port.
Figure 5:
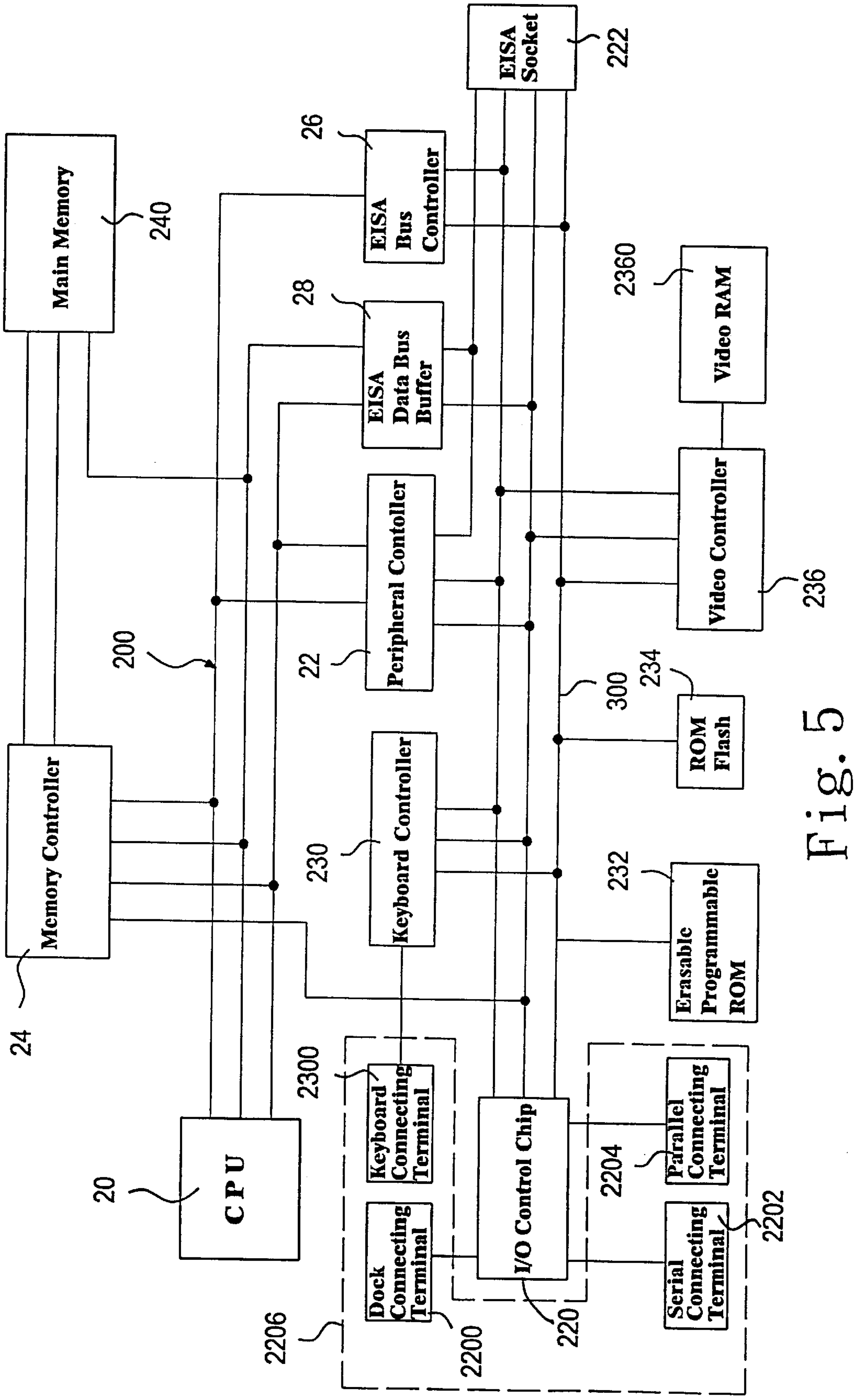
FIG. 5 is a block circuit diagram of an embodiment of the present invention.
Figure 6:
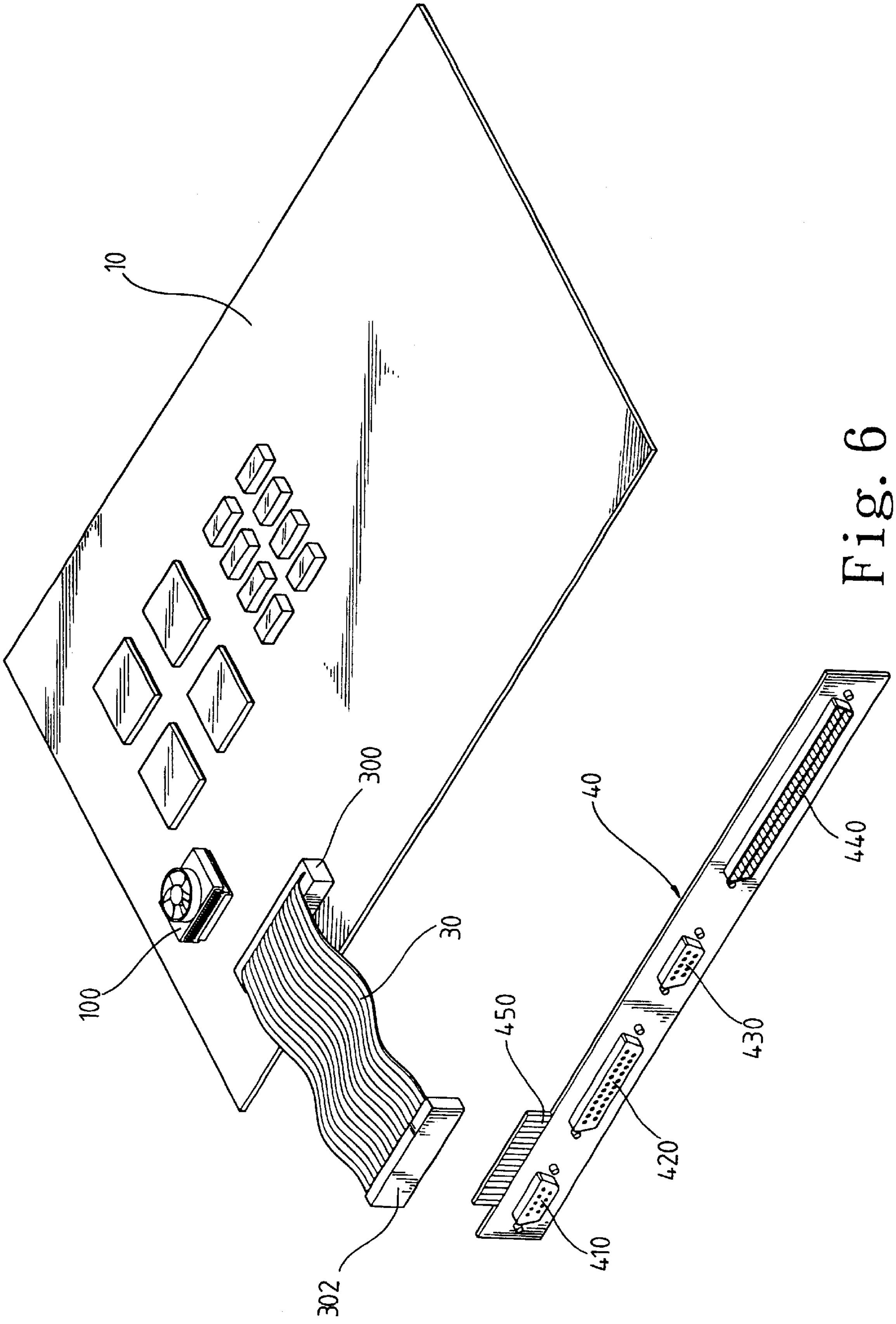
FIG. 6 is a perspective view of the embodiment of the present invention.

Please refer to FIGS. 5 and 6. In the I/O connector combination module of the portable computer of the present invention, an I/O connector combination terminal 101 is disposed on the main board 10. In this embodiment, the main board 10 is equipped with an extension to industry standard architecture (EISA) socket. However, in application, the main board 10 is not such limited. For example, the main board can be those equipped with peripheral component interconnect (PCI) socket or industry standard architecture (ISA) socket, etc.

The main board 10 is disposed with main components of a central processing unit (CPU) 20, a peripheral controller 22, a memory controller 24, an EISA bus controller 26, an EISA data bus buffer 28, etc. and a main bus 200 and an EISA bus 300. The CPU 20 are electrically connected with the respective components via the buses 200 and 300.

The memory controller 24 are electrically connected with the main bus 200 and the EISA bus 300. The memory controller 24 is connected with a main memory 240 to provide addresses and controlling signals for the main memory 240.

The EISA bus controller 26 and the EISA data bus buffer 28 are respectively electrically connected with the main bus 200 and the EISA bus 300 to provide data and addresses transmitted thereby.

The peripheral controller 22 is electrically connected with the main bus 200 and the EISA bus 300 to provide functions of computer interruption system, EISA bus using right, timer, etc. The video controller 236 is electrically connected with the EISA bus 300 and video RAM 2360 to provide output of video signals.

The EISA bus 300 is connected with a flash ROM 234 and an erasable programmable read-only memory (EPROM) 232 to provide computer basic input output system (BIOS) and boot procedure and other basic operation commands.

The I/O control chip 220 is electrically connected with the EISA bus 300 to provide a set of dock connecting terminals 2200, a set of serial bus connecting terminals 2202 and a set of parallel bus connecting terminals 2204.

The keyboard controller 230 is electrically connected with the EISA bus 300. A set of keyboard connecting terminals 2300 extend from the keyboard controller 230 to electrically connect with a keyboard connector.

The dock mouse connecting terminal 2200, serial bus connecting terminal 2202, parallel bus connecting terminal 2204 and the keyboard connecting terminal 2300 are combined into a bus connecting terminal 2206.

Figure 7:
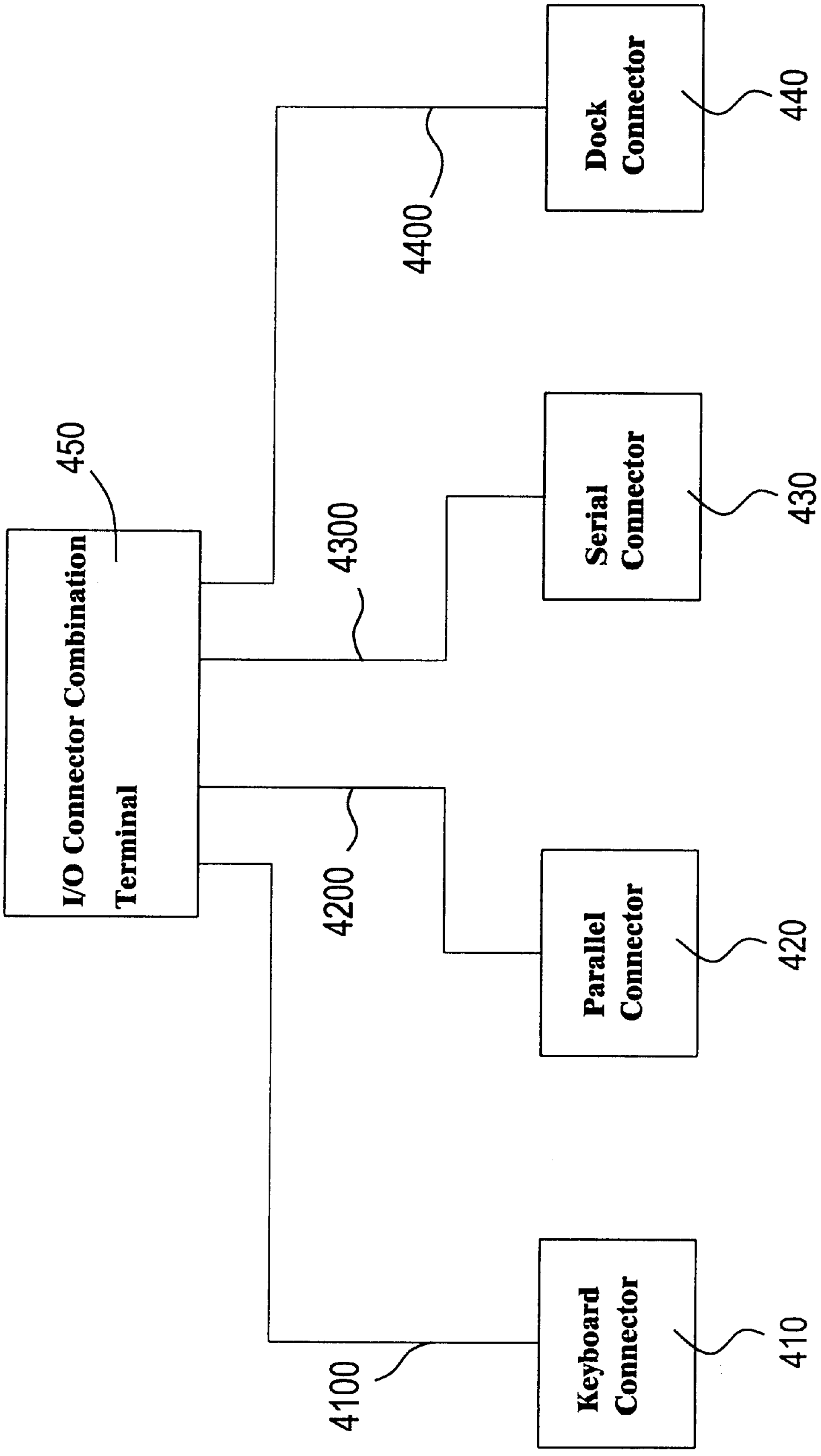
FIG. 7 is a block circuit diagram of the I/O connector circuit board of the present invention.

Please refer to FIG. 7. The I/O connector circuit board 40 is a modularized combination circuit board, including a keyboard connector 410, a parallel connector 420, a serial connector 430, a dock connector 440 and an I/O connector combination terminal 450. The keyboard connector 410 is electrically connected with the I/O connector combination terminal 450 via a bus 4100. The parallel connector 420 is electrically connected with the I/O connector combination terminal 450 via a parallel bus 4200. The serial connector 430 is electrically connected with the I/O connector combination terminal 450 via a serial bus 4300. The dock connector 440 is electrically connected with the I/O connector combination terminal 450 via a dock bus 4400. The I/O connector combination terminal 450 is correspondingly one-to-one electrically connected with the keyboard connector 410, parallel connector 420, serial connector 430 and the dock connector 440. The connecting wires are not commonly used. The I/O connector circuit board 40 is electrically connected with the I/O connecting terminal 2206 of the main board 10 via a bus 30 so that the main board 10 with different arrangement is applicable.

Figure 8:
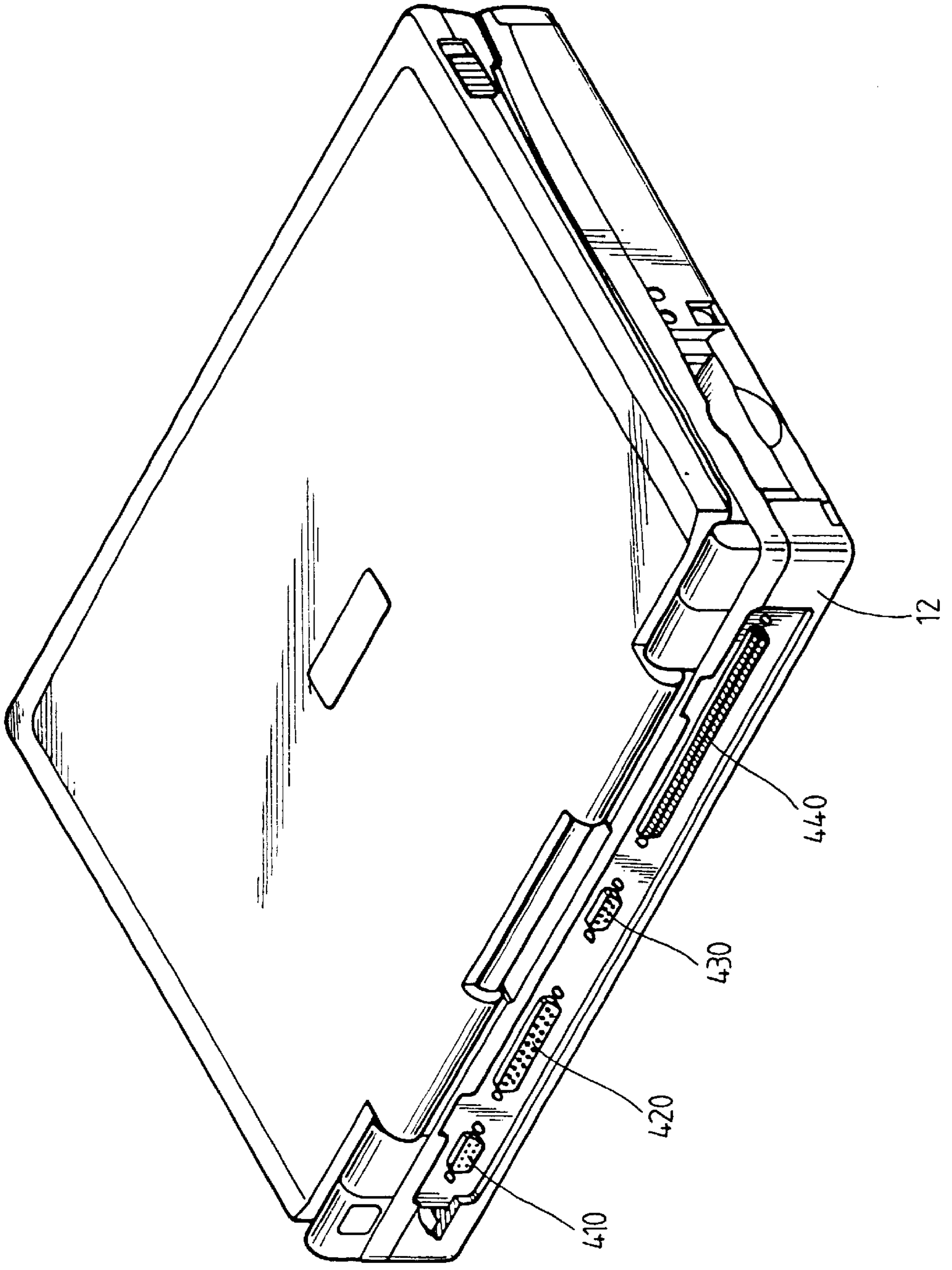
FIG. 8 is a perspective view of a portable computer to which the embodiment of the present invention is applied.

Please refer to FIG. 6. When assembled, the first connecting terminal 300 of the bus 30 is electrically connected with the bus connecting terminal 2206 of the main board 10 and the I/O connector circuit board 40 is engaged with the housing 12 of the portable computer. Please refer to FIG. 8. In this embodiment, the housing 12 of the portable computer 12 is formed with an insertion groove and the upper side of the I/O connector circuit board 40 is correspondingly formed with a receptacle. The second connecting terminal 302 of the bus 30 is inserted with the I/O connector combination terminal 450.

The above embodiments are only used to illustrate the present invention, not intended to limit the scope thereof. Many modifications of the above embodiments can be made without departing from the spirit of the present invention.

What is claimed is:

1. An I/O connector combination module of a portable computer, comprising:

a main circuit board disposed with multiple I/O connecting terminals;

multiple electrically connecting wires first ends of which are electrically connected with each of the I/O connecting terminals; and an I/O connector circuit board separate from the main circuit board and fixedly mounted on one side of the portable computer, the I/O connector circuit board being disposed with multiple I/O ports and at least one combination terminal, the I/O ports being electrically connected with the combination terminal via said electrically connecting wires, the combination terminal being electrically connected with second ends of the electrically connecting wires.

2. An I/O connector combination module of a portable computer as claimed in claim 1, wherein the I/O connecting terminals and the combination terminal are formed as bus-type insertion terminals, whereby the multiple electrically connecting wires are combined into a bus and said first and second ends are respectively arranged to be inserted into the I/O connecting terminals and the combination terminal.

* * * * *